United States Patent
Chen et al.

(10) Patent No.: US 11,170,525 B2
(45) Date of Patent: Nov. 9, 2021

(54) AUTONOMOUS VEHICLE BASED POSITION DETECTION METHOD AND APPARATUS, DEVICE AND MEDIUM

(71) Applicant: Baidu Online Network Technology (Beijing) Co., Ltd., Beijing (CN)

(72) Inventors: Jiajia Chen, Beijing (CN); Ji Wan, Beijing (CN); Tian Xia, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 216 days.

(21) Appl. No.: 16/512,907

(22) Filed: Jul. 16, 2019

(65) Prior Publication Data
US 2019/0340783 A1 Nov. 7, 2019

(30) Foreign Application Priority Data
Sep. 11, 2018 (CN) .......................... 201811056854.6

(51) Int. Cl.
*G06K 9/00* (2006.01)
*G06T 7/73* (2017.01)
(Continued)

(52) U.S. Cl.
CPC .............. *G06T 7/73* (2017.01); *G05D 1/0088* (2013.01); *G06K 9/00791* (2013.01); *G06N 3/04* (2013.01);
(Continued)

(58) Field of Classification Search
CPC . G06T 2207/20081; G06T 2207/20084; G06T 2207/30252; G06K 9/627
See application file for complete search history.

(56) References Cited

U.S. PATENT DOCUMENTS 7,602,945 B2 * 10/2009 Kubo ........................ B60R 1/00
340/903
8,548,643 B2 * 10/2013 Asano .................... G08G 1/166
701/1
(Continued)

FOREIGN PATENT DOCUMENTS

CN 105631880 A 6/2016
CN 108009524 A 5/2018
(Continued)

OTHER PUBLICATIONS

On-Board Vision System for Lane Recognition and Front-Vehicle Detection to Enhance Driver's Awareness, Shih-Shinh Huang et al., IEEE, 0-7803-8232-3, 2004, pp. 2456-2461 (Year: 2004).*
(Continued)

*Primary Examiner* — Jayesh A Patel
(74) *Attorney, Agent, or Firm* — Harness, Dickey & Pierce, P.L.C.

(57) ABSTRACT

The present application provides autonomous vehicle based position detection method and apparatus, a device and a medium, where the method includes: identifying an obtained first visual perception image according to an underlying neural network layer in a slender convolution kernel neural network model to determine feature information of the target linear object image, and identifying the feature information of the target linear object image by using a high-level neural network layer in the slender convolution kernel neural network model to determine size information of the target linear object image; further, matching the size information of the target linear object image with preset coordinate system map information to determine a position of the autonomous vehicle. Embodiments of the present application can accurately determine the position of the autonomous vehicle.

18 Claims, 5 Drawing Sheets

(51) Int. Cl.
*G06T 7/62* (2017.01)
*G05D 1/00* (2006.01)
*G06N 3/04* (2006.01)
*G06N 3/08* (2006.01)

(52) U.S. Cl.
CPC .............. *G06N 3/08* (2013.01); *G06T 7/62* (2017.01); *G06T 2207/20081* (2013.01); *G06T 2207/20084* (2013.01); *G06T 2207/30252* (2013.01)

(56) References Cited

U.S. PATENT DOCUMENTS

| | | | |
|---|---|---|---|
| 10,062,169 B2* | 8/2018 | Kurz | G06T 7/70 |
| 10,304,191 B1* | 5/2019 | Mousavian | G06T 7/50 |
| 10,373,338 B2* | 8/2019 | Inoue | H04N 17/002 |
| 10,445,928 B2* | 10/2019 | Nehmadi | G01S 13/931 |
| 10,817,730 B2* | 10/2020 | Sakamoto | B60W 30/0956 |
| 10,977,944 B2* | 4/2021 | Baba | B60W 30/09 |
| 2008/0097699 A1* | 4/2008 | Ono | B62D 15/0265 701/300 |
| 2008/0310680 A1* | 12/2008 | Azuma | G06K 9/00791 382/104 |
| 2011/0249867 A1* | 10/2011 | Haas | G06K 9/6257 382/103 |
| 2014/0266803 A1* | 9/2014 | Bulan | G06K 9/00785 340/932.2 |
| 2015/0022552 A1* | 1/2015 | Ito | G06T 11/00 345/633 |
| 2015/0219758 A1* | 8/2015 | Gammenthaler | G08G 1/04 382/103 |
| 2016/0339959 A1* | 11/2016 | Lee | G06K 9/00798 |
| 2017/0124415 A1* | 5/2017 | Choi | G06K 9/628 |
| 2018/0095465 A1* | 4/2018 | Gao | G01C 21/34 |
| 2018/0120107 A1* | 5/2018 | Maehara | G06T 7/593 |
| 2018/0182113 A1* | 6/2018 | Kimura | G06T 7/11 |
| 2018/0247160 A1* | 8/2018 | Rohani | G05D 1/0088 |
| 2019/0073774 A1* | 3/2019 | Kwant | G06K 9/00818 |
| 2019/0079523 A1* | 3/2019 | Zhu | G05D 1/0217 |
| 2019/0080266 A1* | 3/2019 | Zhu | G01C 21/3453 |
| 2019/0178436 A1* | 6/2019 | Mao | B64C 39/024 |
| 2019/0196485 A1* | 6/2019 | Li | G08G 1/00 |
| 2019/0259176 A1* | 8/2019 | Dai | G06K 9/00798 |
| 2020/0019165 A1* | 1/2020 | Levandowski | G08G 1/096725 |
| 2020/0116499 A1* | 4/2020 | Jung | G08G 1/167 |

FOREIGN PATENT DOCUMENTS

| | | | | |
|---|---|---|---|---|
| CN | 108090456 A | 5/2018 | | |
| CN | 108197619 A | 6/2018 | | |
| CN | 108450034 A | 8/2018 | | |
| EP | 3343172 A1 | 4/2018 | | |
| EP | 3343172 A1 * | 7/2018 | ......... | G06K 9/00201 |
| JP | 2017533482 A | 11/2017 | | |

OTHER PUBLICATIONS

On Visual Crosswalk Detection for Driver Assistance Systems, Anselm Haselhoff et al.,IEEE, 978-1-4244-7868, 2010, pp. 883-888 (Year: 2010).*

Wu et al.; Vehicle localization using road markings; IEEE Intelligent Vehicles Symposium, Jun. 23, 2013; p. 1185-1190.

* cited by examiner

AUTONOMOUS VEHICLE BASED POSITION DETECTION METHOD AND APPARATUS, DEVICE AND MEDIUM

CROSS-REFERENCE TO RELATED APPLICATION

This application claims priority to Chinese Patent Application No. 201811056854.6, filed on Sep. 11, 2018, which is hereby incorporated by reference in its entirety.

TECHNICAL FIELD

The present application relates to the field of automatic driving technology, and in particular, to autonomous vehicle based position detection method and apparatus, a device and a medium.

BACKGROUND

During an operation of an autonomous vehicle, it needs to position the autonomous vehicle. A linear object (such as a telegraph pole, zebra crossings, or a lane line, etc.) in a visual image detected by the autonomous vehicle has a very good reference function for the positioning of the autonomous vehicle. Therefore, a detection technology for the linear object is particularly important in the field of automatic driving.

In the prior art, a conventional deep learning algorithm is generally used to detect a linear object in a visual image.

However, in the prior art, since the linear object in the visual image is a dense and slender object, the linear object in the visual image cannot be accurately detected by using the conventional deep learning algorithm, thereby failing to accurately determine a position of the autonomous vehicle.

SUMMARY

The present application provides autonomous vehicle based position detection method and apparatus, a device and a medium, which solve the technical problem that the position of the autonomous vehicle cannot be accurately determined in the prior art.

In a first aspect, the present application provides an autonomous vehicle based position detection method, including:

obtaining a first visual perception image of an autonomous vehicle; where the first visual perception image includes a target linear object image;

identifying the first visual perception image according to an underlying neural network layer in a slender convolution kernel neural network model to determine feature information of the target linear object image;

identifying the feature information of the target linear object image by using a high-level neural network layer in the slender convolution kernel neural network model to determine size information of the target linear object image; and matching the size information of the target linear object image with preset coordinate system map information to determine a position of the autonomous vehicle.

In a possible implementation, the identifying the feature information of the target linear object image by using a high-level neural network layer in the slender convolution kernel neural network model to determine size information of the target linear object image includes:

dividing the feature information of the target linear object image into equally spaced feature matrices along a form of the target linear object;

performing a weighted summation operation on each of the feature matrices and a slender convolution kernel in the slender convolution kernel neural network model respectively to obtain an operation result; and identifying the operation result according to the high-level neural network layer in the slender convolution kernel neural network model to determine the size information of the target linear object image.

In a possible implementation, the matching the size information of the target linear object image with preset coordinate system map information to determine a position of the autonomous vehicle includes:

projecting the preset coordinate system map information to the first visual perception image to obtain a projected coordinate system map information;

judging, in the projected coordinate system map information, whether there is a target object that matches the size information of the target linear object image; and determining the position of the autonomous vehicle according to a shooting angle of the first visual perception image and the projected coordinate system map information when it is determined that there is the target object.

In a possible implementation, the method further includes:

obtaining the slender convolution kernel neural network model.

In a possible implementation, the obtaining the slender convolution kernel neural network model includes:

training a preset neural network model according to a preset visual perception image, feature information of a preset linear object image, and size information of the preset linear object image to generate the slender convolution kernel neural network model; where the preset visual perception image includes the preset linear object image.

In a possible implementation, the training a preset neural network model according to a preset visual perception image, feature information of a preset linear object image, and size information of the preset linear object image to generate the slender convolution kernel neural network model includes:

training the preset neural network model according to the preset visual perception image and the feature information of the preset linear image to generate an initial slender convolution kernel neural network model, where the initial slender convolution kernel neural network model has a mature underlying neural network layer; and training the initial slender convolution kernel neural network model according to the feature information of the preset linear object image and the size information of the preset linear object image to generate a final slender convolution kernel neural network model, where the final slender convolution kernel neural network model has a mature high-level neural network layer and the mature underlying neural network layer.

In a possible implementation, the obtaining a first visual perception image of an autonomous vehicle includes:

obtaining the first visual perception image by an image acquisition apparatus in the autonomous vehicle.

In a second aspect, the present application provides an autonomous vehicle based position detection apparatus, including:

a first obtaining module, configured to obtain a first visual perception image of an autonomous vehicle; where the first visual perception image includes a target linear object image;

a first determining module, configured to identify the first visual perception image according to an underlying neural network layer in a slender convolution kernel neural network model to determine feature information of the target linear object image;

a second determining module, configured to identify the feature information of the target linear object image by using a high-level neural network layer in the slender convolution kernel neural network model to determine size information of the target linear object image; and a third determining module, configured to match the size information of the target linear object image with preset coordinate system map information to determine a position of the autonomous vehicle.

In a possible implementation, the second determining module includes:

a dividing unit, configured to divide the feature information of the target linear object image into equally spaced feature matrices along a form of the target linear object;

a computing unit, configured to perform a weighted summation operation on each of the feature matrices and a slender convolution kernel in the slender convolution kernel neural network model respectively to obtain an operation result; and a first determining unit, configured to identify the operation result according to the high-level neural network layer in the slender convolution kernel neural network model to determine the size information of the target linear object image.

In a possible implementation, the third determining module includes:

a projecting unit, configured to project the preset coordinate system map information to the first visual perception image to obtain a projected coordinate system map information;

a judging unit, configured to judge, in the projected coordinate system map information, whether there is a target object that matches the size information of the target linear object image; and a second determining unit, configured to determine the position of the autonomous vehicle according to a shooting angle of the first visual perception image and the projected coordinate system map information when the judging unit determines that there is the target object.

In a possible implementation, the apparatus further includes:

a second obtaining module, configured to obtain the slender convolution kernel neural network model.

In a possible implementation, the second obtaining module is specifically configured to:

train a preset neural network model according to a preset visual perception image, feature information of a preset linear object image, and size information of the preset linear object image to generate the slender convolution kernel neural network model; where the preset visual perception image includes the preset linear object image.

In a possible implementation, the second obtaining module is specifically configured to:

train the preset neural network model according to the preset visual perception image and the feature information of the preset linear image to generate an initial slender convolution kernel neural network model, where the initial slender convolution kernel neural network model has a mature underlying neural network layer; and train the initial slender convolution kernel neural network model according to the feature information of the preset linear object image and the size information of the preset linear object image to generate a final slender convolution kernel neural network model, where the final slender convolution kernel neural network model has a mature high-level neural network layer and the mature underlying neural network layer.

In a possible implementation, the first obtaining module is specifically configured to:

obtain the first visual perception image by an image acquisition apparatus in the autonomous vehicle.

In a third aspect, the present application provides a control device, including: a memory and a processor;

where the memory is configured to store computer instructions; and the processor is configured to run the computer instructions stored in the memory to implement the autonomous vehicle based position detection method according to any implementation of the first aspect.

In a fourth aspect, the present application provides a storage medium, including: a readable storage medium and computer instructions, where the computer instructions are stored in the readable storage medium; and the computer instructions are configured to implement the autonomous vehicle based position detection method according to any implementation of the first aspect.

In the autonomous vehicle based position detection method and apparatus, the device and the medium provided by the embodiments of the present application, an obtained first visual perception image of an autonomous vehicle is identified according to an underlying neural network layer in a slender convolution kernel neural network model to determine feature information of the target linear object image, and the feature information of the target linear object image is identified by using a high-level neural network layer in the slender convolution kernel neural network model to determine size information of the target linear object image; further, the size information of the target linear object image is matched with preset coordinate system map information to determine a position of the autonomous vehicle. The embodiments of the present application, by identifying the first visual perception image to be detected using the underlying neural network layer and the high-level neural network layer in the slender convolution kernel neural network model, can accurately determine the size information of the target linear object image, thereby the position of the autonomous vehicle can be accurately determined according to the size information of the target linear object image and the preset coordinate system map information.

BRIEF DESCRIPTION OF DRAWINGS

In order to illustrate embodiments of the present application or the technical solutions in the prior art more clearly, accompanying drawings used in description of the embodiments or the prior art will be briefly illustrated below. Obviously, the accompanying drawings in the following description are some embodiments of the present application, and other accompanying drawings can be obtained according to these accompanying drawings without any creative work for those skilled in the art.

DESCRIPTION OF EMBODIMENTS

Figure 1:
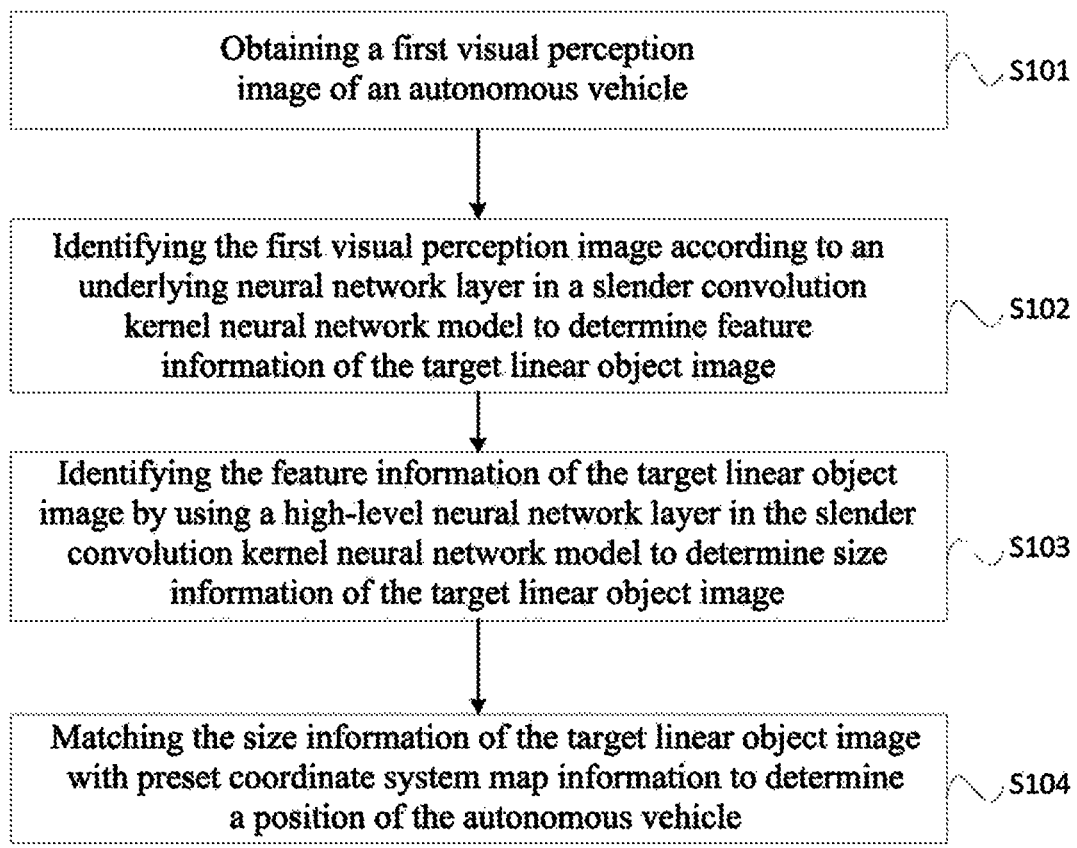
FIG. 1 is a schematic flowchart of an autonomous vehicle based position detection method provided by an embodiment of the present application.

First, the application scenario of the embodiment of the present application and some of the vocabularies involved are explained.

The autonomous vehicle based position detection method and the apparatus, the device and the medium provided by the embodiments of the present application can be applied to an application scenario of autonomous vehicle positioning, and can accurately determine the position of the autonomous vehicle.

An executive entity of the autonomous vehicle based position detection method provided by the embodiments of the present application can be an autonomous vehicle based position detection apparatus or a control device (for the convenience of description, the embodiment is illustrated by taking an example where the executive entity is the autonomous vehicle based position detection apparatus). As an example, the apparatus can be implemented in software and/or hardware.

A target linear object image and/or a preset linear object image involved in the embodiments of the present application may include, but are not limited to, at least one of the following: a telegraph pole image, a zebra crossing image, or a lane line image.

A preset neural network model involved in the embodiments of the present application may include, but not limited to, a preset underlying neural network layer and a preset high-level neural network layer.

An initial slender convolution kernel neural network model involved in the embodiments of the present application refers to a neural network model obtained by training the underlying neural network layer of the preset neural network model. As an example, the initial slender convolution kernel neural network model can include, but not limited to, a mature underlying neural network layer and the preset high-level neural network layer.

A slender convolution kernel neural network model (or a final slender convolution kernel neural network model) involved in the embodiments of the present application refers to a neural network model obtained by training the underlying neural network layer and a high-level neural network layer of the preset neural network model. As an example, the slender convolution kernel neural network model may include, but not limited to, the mature underlying neural network layer and a mature high-level neural network layer.

As an example, the underlying neural network layer in the slender convolution kernel neural network model is configured to extract feature information of a target linear object image in a first visual perception image; and the high-level neural network layer in the slender convolution kernel neural network model is configured to learn the feature information of the target linear object image to identify size information of the target linear object image.

A preset coordinate system map information involved in the embodiments of the present application refers to preset accurate coordinate system map information in the autonomous vehicle, so as to determine a position of the autonomous vehicle. As an example, the preset coordinate system map information may be updated in real time or updated every preset time period.

The autonomous vehicle based position detection method and the apparatus, the device and the medium provided by the embodiments of the present application, by identifying a first visual perception image to be detected using the underlying neural network layer and the high-level neural network layer in the slender convolution kernel neural network model to determine the size information of the target linear object image, and thereby determining the position of the autonomous vehicle according to the size information of the target linear object image and the preset coordinate system map information, solves the problem that the position of the automatic determination cannot be accurately determined in the prior art.

The technical solutions of the present application and how to solve the above technical problem by the technical solutions of the present application are described in detail in the following specific embodiments. The following specific embodiments may be combined with each other, and the same or similar concepts or processes may not be described in some embodiments.

FIG. 1 is a schematic flowchart of an autonomous vehicle based position detection method provided by an embodiment of the present application. As shown in FIG. 1, the autonomous vehicle based position detection method provided by the embodiment may include:

Step S101: obtaining a first visual perception image of an autonomous vehicle.

In this step, an autonomous vehicle based position detection apparatus obtains the first visual perception image (for indicating image information of a surrounding environment of the autonomous vehicle) of the autonomous vehicle; where the first visual perception image includes a target linear object image.

In an embodiment, the autonomous vehicle based position detection apparatus can obtain the first visual perception image by an image acquisition apparatus of the autonomous vehicle. As an example, the image acquisition apparatus can include, but not limited to, at least one of the following: a camera or a laser detector.

Of course, the autonomous vehicle based position detection apparatus can also obtain the first visual perception image of the autonomous vehicle by other implementable manners, which is not limited in the embodiment of the present application.

Step S102: identifying the first visual perception image according to an underlying neural network layer in a slender convolution kernel neural network model to determine feature information of the target linear object image.

In the embodiment of the present application, the slender convolution kernel neural network model may include, but not limited to, a mature underlying neural network layer and a mature high-level neural network layer.

In this step, the autonomous vehicle based position detection apparatus inputs the first visual perception image into the slender convolution kernel neural network model, and the underlying neural network layer in the slender convolution kernel neural network model identifies the first visual perception image to determine the feature information of the target linear object image.

As an example, the feature information of the target linear object image may be stored in the form of a matrix or a list, and may of course be stored in other forms, which is not limited in the embodiment of the present application.

Step S103: identifying the feature information of the target linear object image by using a high-level neural network layer in the slender convolution kernel neural network model to determine size information of the target linear object image.

In this step, the autonomous vehicle based position detection apparatus inputs the feature information of the target linear object image into the high-level neural network layer in the slender convolution kernel neural network model, and the high-level neural network layer in the slender convolution kernel neural network model further performs feature learning on the feature information of the target linear object image to identify the size information of the target linear object image.

As an example, the size information of the target linear object image may include, but not limited to, head and tail positions and/or a width of the target linear object image.

Step S104: matching the size information of the target linear object image with preset coordinate system map information to determine a position of the autonomous vehicle.

In this step, as an example, the autonomous vehicle based position detection apparatus may convert a three-dimensional preset coordinate system map information into a two-dimensional coordinate system map information, so as to match with the size information of the target linear object image (including, for example, but not limited to, the head and tail positions and/or the width of the target linear object image), so that the position of the autonomous vehicle can be accurately determined, and thus the autonomous vehicle is further controlled (for example, the autonomous vehicle is controlled to be parked between two telegraph poles, the autonomous vehicle is controlled to stop in front of zebra crossings, or the autonomous vehicle is controlled to run in parallel with the lane line, etc.).

In the autonomous vehicle based position detection method provided by the embodiment of the present application, an obtained first visual perception image of an autonomous vehicle is identified according to an underlying neural network layer in a slender convolution kernel neural network model to determine feature information of the target linear object image, and the feature information of the target linear object image is identified by using a high-level neural network layer in the slender convolution kernel neural network model to determine size information of the target linear object image; further, the size information of the target linear object image is matched with preset coordinate system map information to determine a position of the autonomous vehicle. The embodiments of the present application, by identifying the first visual perception image to be detected using the underlying neural network layer and the high-level neural network layer in the slender convolution kernel neural network model, can accurately determine the size information of the target linear object image, thereby the position of the autonomous vehicle can be accurately determined according to the size information of the target linear object image and the preset coordinate system map information.

Figure 2:
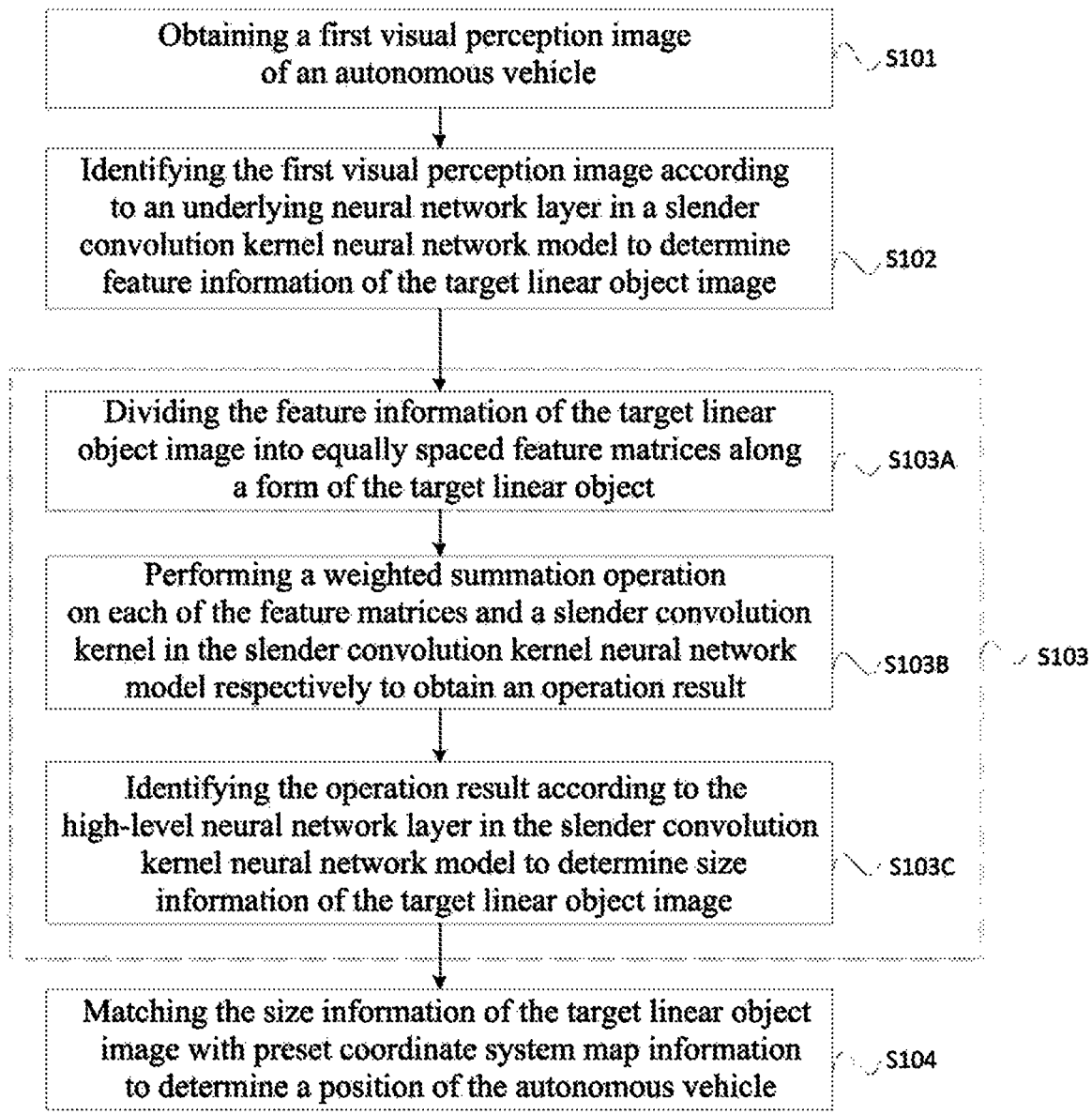
FIG. 2 is a schematic flowchart of an autonomous vehicle based position detection method provided by another embodiment of the present application.

FIG. 2 is a schematic flowchart of an autonomous vehicle based position detection method provided by another embodiment of the present application. On the basis of the above embodiment, a specific implementable manner of the above step S103 is illustrated in the embodiment of the present application. As shown in FIG. 2, step S103 in the embodiment may include:

Step S103A: dividing the feature information of the target linear object image into equally spaced feature matrices along a form of the target linear object.

In this step, the autonomous vehicle based position detection apparatus divides the feature information of the target linear object image into equally spaced feature matrices along the form of the target linear object (for example, a length direction or a width direction, etc.).

For example, it is assumed that a length of the target linear object is 5 m and an interval is 1 m, the autonomous vehicle based position detection apparatus divides the feature information of the target linear object image into equally spaced feature matrix 1, feature matrix 2, feature matrix 3, feature matrix 4, and feature matrix 5 along a length direction of the target linear object; where a length of the target linear object corresponding to feature information in each of the feature matrices is 1 m.

Step S103B: performing a weighted summation operation on each of the feature matrices and a slender convolution kernel in the slender convolution kernel neural network model respectively to obtain an operation result.

In this step, the autonomous vehicle based position detection apparatus performs the weighted summation operation on each of the feature matrices obtained by the equally spaced division and the slender convolution kernel in the slender convolution kernel neural network model respectively to obtain the operation result of the weighted summation.

For example, it is assumed that the feature matrices obtained by the equally spaced division includes: the feature matrix 1, the feature matrix 2, the feature matrix 3, the feature matrix 4, and the feature matrix 5, the autonomous vehicle based position detection apparatus perform the weighted summation operation on the feature matrix 1, the feature matrix 2, the feature matrix 3, the feature matrix 4, and the feature matrix 5 and the slender convolution kernel in the slender convolution kernel neural network model to obtain the weighted summation operation result.

Step S103C: identifying the operation result according to the high-level neural network layer in the slender convolution kernel neural network model to determine the size information of the target linear object image.

In this step, the autonomous vehicle based position detection apparatus inputs the operation result of the weighted summation to the high-level neural network layer in the slender convolution kernel neural network model, and the high-level neural network layer in the slender convolution kernel neural network model performs feature learning on the operation result of the weighted summation to identify the size information of the target linear object image.

The autonomous vehicle based position detection method provided by the embodiment of the present application, by dividing the feature information of the target linear object image obtained by identifying the first visual perception image according to the underlying neural network layer in the slender convolution kernel neural network model into equally spaced feature matrices along the form of the target linear object; further, by performing a weighted summation operation on each of the feature matrices and a slender convolution kernel in the slender convolution kernel neural network model respectively to obtain an operation result; and further, by identifying the operation result according to the high-level neural network layer in the slender convolution kernel neural network model, can accurately determine the size information of the target linear object image, thereby accurately determining the position of the autonomous vehicle according to the size information of the target linear object image and the preset coordinate system map information.

Figure 3:
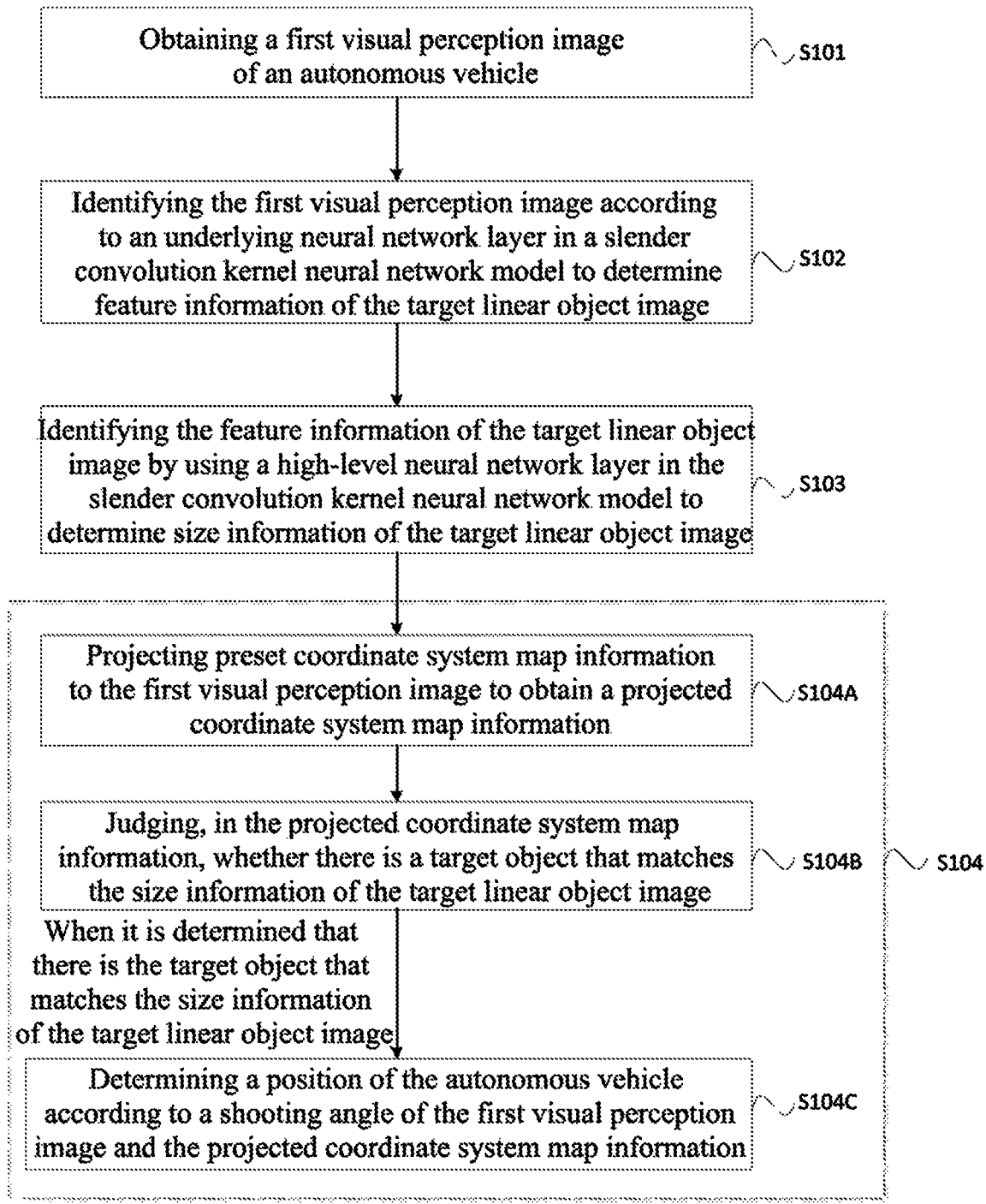
FIG. 3 is a schematic flowchart of an autonomous vehicle based position detection method provided by another embodiment of the present application.

FIG. 3 is a schematic flowchart of an autonomous vehicle based position detection method provided by another embodiment of the present application. On the basis of the above embodiments, the specific implementable manner of the above step S104 is illustrated in the embodiment of the present application. As shown in FIG. 3, step S104 in the embodiment may include:

Step S104A: projecting the preset coordinate system map information to the first visual perception image to obtain a projected coordinate system map information.

In this step, in order to facilitate matching with the size information (two-dimensional information) of the target linear object image, the autonomous vehicle based position detection apparatus may project the three-dimensional preset coordinate system map information to the two-dimensional first visual perception image to obtain the projected two-dimensional coordinate system map information.

Step S104B: judging, in the projected coordinate system map information, whether there is a target object that matches the size information of the target linear object image.

In this step, the autonomous vehicle based position detection apparatus matches the size information of the target linear object image with the projected two-dimensional coordinate system map information. As an example, the autonomous vehicle based position detection apparatus judges, in the projected two-dimensional coordinate system map information, whether there is a target object (including, for example, but not limited to a telegraph pole, zebra crossings, an lane line) that matches the size information of the target linear object image (including, for example, but not limited to, the head and tail positions and/or the width of the target linear object image); when it is determined that there is the target object that matches the size information of the target linear object image, the position of the autonomous vehicle is determined to be around the target object, thereby step S104C is performed to determine an exact position of the autonomous vehicle.

Step S104C: determining the position of the autonomous vehicle according to a shooting angle of the first visual perception image and the projected coordinate system map information.

In this step, the autonomous vehicle based position detection apparatus can accurately determine the position of the autonomous vehicle in the projected coordinate system map information by combining the shooting angle of the first visual perception image with the target object in the projected coordinate system map information. As an example, the autonomous vehicle based position detection apparatus can check the position of the target object in the projected coordinate system map information by detecting the shooting angle of the first visual perception image, that is, the exact position of the autonomous vehicle.

In the embodiment of the present application, after the size information of the target linear object image is accurately determined by identifying the first visual perception image to be detected by using the underlying neural network layer and the high-level neural network layer in the slender convolution kernel neural network model, the preset coordinate system map information is projected to the first visual perception image to obtain a projected coordinate system map information; further, it is judged, in the projected coordinate system map information, whether there is a target object that matches the size information of the target linear object image is judged; and when it is determined that there is the target object that matches the size information of the target linear object image, the position of autonomous vehicle can be accurately determined according to a shooting angle of the first visual perception image and the projected coordinate system map information.

Figure 4:
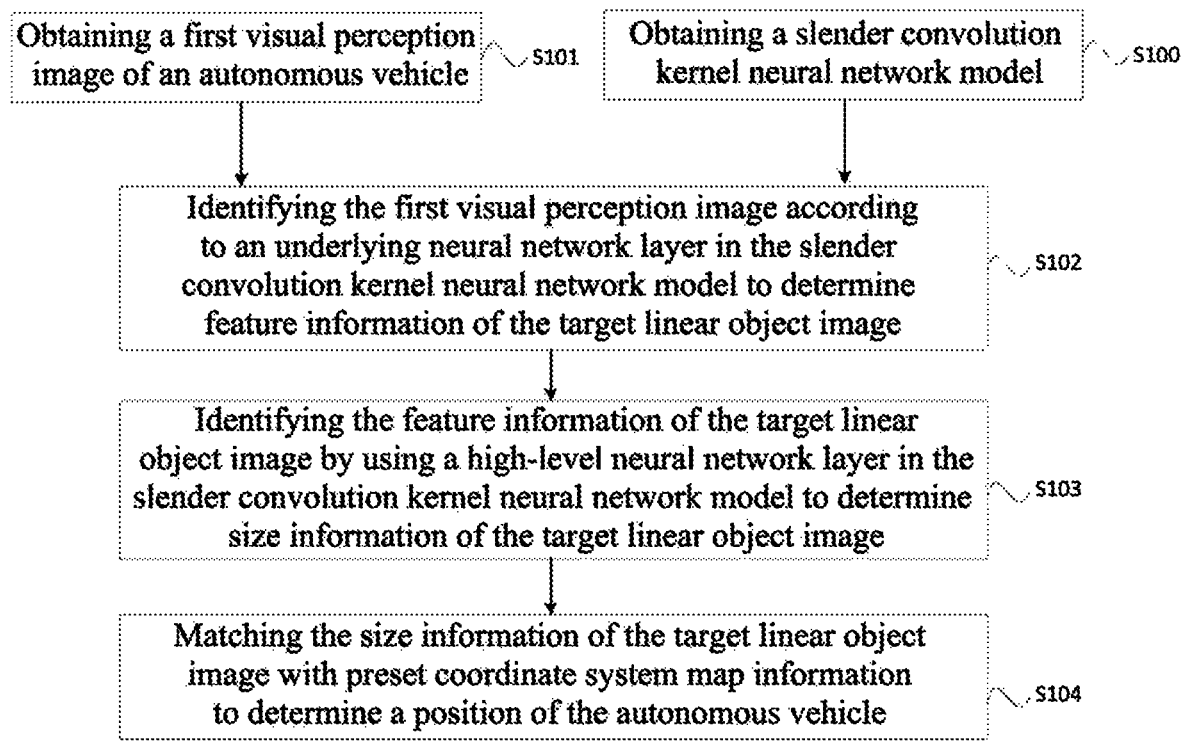
FIG. 4 is a schematic flowchart of an autonomous vehicle based position detection method provided by another embodiment of the present application.

FIG. 4 is a schematic flowchart of an autonomous vehicle based position detection method provided by another embodiment of the present application. On the basis of the above embodiments, before the above step S102, the embodiment of the present application further includes:

Step S100: obtaining the slender convolution kernel neural network model.

In this step, the autonomous vehicle based position detection apparatus needs to obtain the slender convolution kernel neural network model before using the slender convolution kernel neural network model in the above step S102.

The following part of the embodiment of the present application introduces a specific implementable manner of the above step S100.

In an embodiment, the preset neural network model is trained according to a preset visual perception image, feature information of a preset linear object image, and size information of the preset linear object image to generate the slender convolution kernel neural network model.

The preset neural network model involved in the embodiments of the present application may include, but not limited to, a preset underlying neural network layer and a preset high-level neural network layer.

In the embodiment of the present application, the autonomous vehicle based position detection apparatus trains the preset neural network model according to the preset visual perception image (including the preset linear object image), the feature information of the preset linear object image, and the size information of the preset linear object image until the neural network model converges, thereby obtaining the slender convolution kernel neural network model.

As an example, the preset neural network model is trained according to the preset visual perception image and the feature information of the preset linear image to generate an initial slender convolution kernel neural network model, where the initial slender convolution kernel neural network model has a mature underlying neural network layer; further, the initial slender convolution kernel neural network model is trained according to the feature information of the preset linear object image and the size information of the preset linear object image to generate a final slender convolution kernel neural network model, where the final slender convolution kernel neural network model has a mature high-level neural network layer and the mature underlying neural network layer.

In the embodiment of the present application, the autonomous vehicle based position detection apparatus trains the preset underlying neural network layer portion in the preset neural network model according to the preset visual perception image until feature information obtained by the training is the same as or similar to the feature information of the preset linear object image (for example, a proportion of the same information is greater than a first preset proportion), thereby obtaining the initial slender convolution kernel neural network model. As an example, the initial slender convolution kernel neural network model may include, but not limited to, the mature underlying neural network layer and the preset high-level neural network layer.

Further, the autonomous vehicle based position detection apparatus trains the preset high-level neural network layer portion in the initial slender convolution kernel neural network model according to the feature information of the preset linear object image until feature information obtained by the training is the same as or similar to the feature information of the preset linear object image (for example, a proportion of the same information is greater than a second preset proportion), thereby obtaining the final slender convolution kernel neural network model, where the final slender convolution kernel neural network model has the mature high-level neural network layer and the mature underlying neural network layer.

Of course, in the embodiment of the present application, the slender convolution kernel neural network model may be obtained by other implementable manners, which is not limited in the embodiment of the present application.

In the embodiment of the present application, the slender convolution kernel neural network model is obtained, so as to identify the first visual perceptual image to be detected according to the underlying neural network layer and the high-level neural network layer of the slender convolution kernel neural network model. Therefore, the size information of the target linear object image can be accurately determined, thereby the position of the autonomous vehicle can be accurately determined according to the size information of the target linear object image and the preset coordinate system map information.

Figure 5:
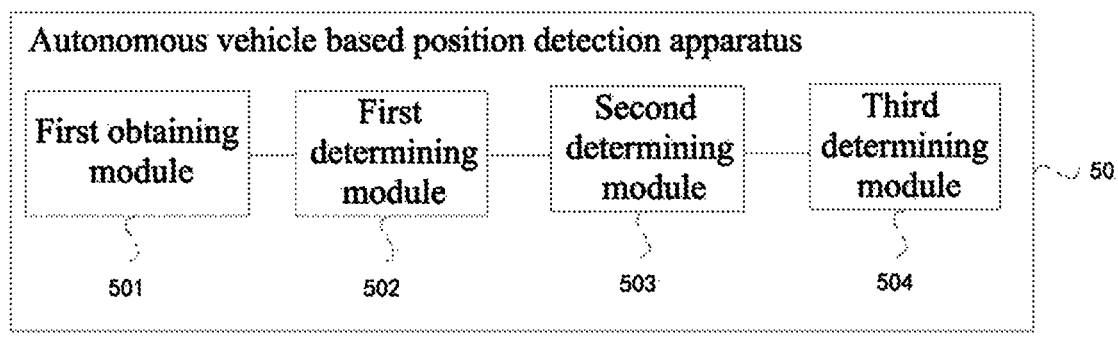
FIG. 5 is a schematic structural diagram of an autonomous vehicle based position detection apparatus provided by an embodiment of the present application.

FIG. 5 is a schematic structural diagram of an autonomous vehicle based position detection apparatus provided by an embodiment of the present application. As shown in FIG. 5, the autonomous vehicle based position detection apparatus 50 provided by the embodiment of the present application may include: a first obtaining module 501, a first determining module 502, a second determining module 503, and a third determining module 504.

The first obtaining module 501 is configured to obtain a first visual perception image of an autonomous vehicle; where the first visual perception image includes a target linear object image;

the first determining module 502 is configured to identify the first visual perception image according to an underlying neural network layer in a slender convolution kernel neural network model to determine feature information of the target linear object image;

the second determining module 503 is configured to identify the feature information of the target linear object image by using a high-level neural network layer in the slender convolution kernel neural network model to determine size information of the target linear object image; and the third determining module 504 is configured to match the size information of the target linear object image with preset coordinate system map information to determine a position of the autonomous vehicle.

In a possible implementation manner, the second determining module 503 includes:

a dividing unit, configured to divide the feature information of the target linear object image into equally spaced feature matrices along a form of the target linear object;

a computing unit, configured to perform a weighted summation operation on each of the feature matrices and a slender convolution kernel in the slender convolution kernel neural network model respectively to obtain an operation result; and a first determining unit, configured to identify the operation result according to the high-level neural network layer in the slender convolution kernel neural network model to determine the size information of the target linear object image.

In a possible implementation, the third determining module 504 includes:

a projecting unit, configured to project the preset coordinate system map information to the first visual perception image to obtain a projected coordinate system map information;

a judging unit, configured to judge, in the projected coordinate system map information, whether there is a target object that matches the size information of the target linear object image; and a second determining unit, configured to determine the position of the autonomous vehicle according to a shooting angle of the first visual perception image and the projected coordinate system map information when the judging unit determines that there is the target object.

In a possible implementation, the autonomous vehicle based position detection apparatus 50 further includes:

a second obtaining module, configured to obtain the slender convolution kernel neural network model.

In a possible implementation, the second obtaining module is specifically configured to:

train a preset neural network model according to a preset visual perception image, feature information of a preset linear object image, and size information of the preset linear object image to generate the slender convolution kernel neural network model; where the preset visual perception image includes the preset linear object image.

In a possible implementation, the second obtaining module is specifically configured to:

train the preset neural network model according to the preset visual perception image and the feature information of the preset linear image to generate an initial slender convolution kernel neural network model, where the initial slender convolution kernel neural network model has a mature underlying neural network layer; and train the initial slender convolution kernel neural network model according to the feature information of the preset linear object image and the size information of the preset linear object image to generate a final slender convolution kernel neural network model, where the final slender convolution kernel neural network model has a mature high-level neural network layer and the mature underlying neural network layer.

In a possible implementation, the first obtaining module 501 is specifically configured to:

obtain the first visual perception image by an image acquisition apparatus in the autonomous vehicle.

The autonomous vehicle based position detection apparatus provided by the embodiment is configured to perform the above technical solution of the autonomous vehicle based position detection method according to the embodiment of the present application. The technical principle and technical effects thereof are similar, which will not be described herein again.

Figure 6:
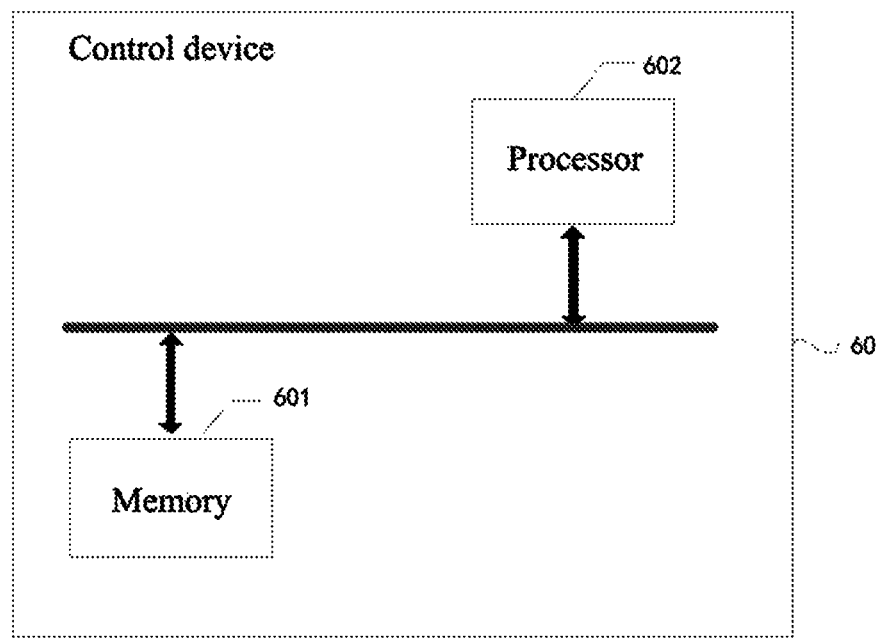
FIG. 6 is a schematic structural diagram of a control device provided by an embodiment of the present application.

FIG. 6 is a schematic structural diagram of a control device provided by an embodiment of the present application. As an example, the control device of the embodiment of the present application can be a controller of an autonomous vehicle or a controller of an autonomous vehicle system, etc. As shown FIG. 6, the control device provided by the embodiment of the present application may include: a memory 601 and a processor 602;

where the memory 601 is configured to store computer instructions; and the processor 602 is configured to run the computer instructions stored in the memory 601 to implement the above technical solution of the autonomous vehicle based position detection method according to the embodiment of the present application. The technical principle and technical effects thereof are similar, which will not be described herein again.

An embodiment of the present application further provides a storage medium, including: a readable storage medium and computer instructions, where the computer instructions are stored in the readable storage medium; and the computer instructions are configured to implement the above technical solution of the autonomous vehicle based position detection method according to the embodiment of the present application. The technical principle and technical effects thereof are similar, which will not be described herein again.

An embodiment of the present application further provides a chip for running instructions, where the chip is configured to implement the above technical solution of the autonomous vehicle based position detection method according to the embodiment of the present application. The technical principle and technical effects thereof are similar, which will not be described herein again.

An embodiment of the present application further provides a program product, where the program product includes a computer program, the computer program is stored in a storage medium, at least one processor can read the computer program from the storage medium, and the at least one processor can implement, when executing the computer program, the above technical solution of the autonomous vehicle based position detection method according to the embodiment of the present application. The technical principle and technical effects thereof are similar, which will not be described herein again.

The above processor 602 may be a central processing unit (CPU), and may be other general-purpose processors, a digital signal processor (DSP), and an application-specific integrated circuits (DSP), an application specific integrated circuit (ASIC), etc. The general-purpose processor may be a microprocessor, or the processor may also be any conventional processor, etc. The steps of the method disclosed in the embodiment of the present application may be directly implemented as executed by a hardware processor, or may be executed by a combination of hardware and software modules in the processor.

Those skilled in the art will appreciate that all or part of the steps to implement the above various method embodiments may be accomplished by hardware associated with the program instructions. The above program can be stored in a computer readable storage medium. When the program is executed, the steps including the above method embodiments are performed; and the above storage medium includes: a read-only memory (ROM), a RAM, a flash memory, a hard disk, a solid state hard disk, a magnetic tape, a floppy disk, an optical disc and any combination thereof.

It should be noted that the above embodiments are only used to illustrate the technical solutions of the embodiments of the present application, and are not limited thereto; although the embodiments of the present application are described in detail with reference to the above embodiments, those skilled in the art should understand that the technical solutions described in the above embodiments still may be modified, or some or all of the technical features may be equivalently substituted; and the modifications or substitutions do not deviate the essence of the corresponding technical solutions from the scope of the technical solution of the embodiments of the present application.

What is claimed is:

1. An autonomous vehicle based position detection method, comprising:

obtaining a first visual perception image of an autonomous vehicle; wherein the first visual perception image comprises a target linear object image;

identifying the first visual perception image according to an underlying neural network layer in a slender convolution kernel neural network model to determine feature information of the target linear object image;

identifying the feature information of the target linear object image by using a high-level neural network layer in the slender convolution kernel neural network model to determine size information of the target linear object image; and matching the size information of the target linear object image with preset coordinate system map information to determine a position of the autonomous vehicle;

wherein the identifying the feature information of the target linear object image by using a high-level neural network layer in the slender convolution kernel neural network model to determine size information of the target linear object image comprises:

dividing the feature information of the target linear object image into equally spaced feature matrices along a form of the target linear object;

performing a weighted summation operation on each of the feature matrices and a slender convolution kernel in the slender convolution kernel neural network model respectively to obtain an operation result; and identifying the operation result according to the high-level neural network layer in the slender convolution kernel neural network model to determine the size information of the target linear object image.

2. The method according to claim 1, wherein the matching the size information of the target linear object image with preset coordinate system map information to determine a position of the autonomous vehicle comprises:

projecting the preset coordinate system map information to the first visual perception image to obtain a projected coordinate system map information;

judging, in the projected coordinate system map information, whether there is a target object that matches the size information of the target linear object image; and determining the position of the autonomous vehicle according to a shooting angle of the first visual perception image and the projected coordinate system map information in a condition that it is determined that there is the target object.

3. The method according to claim 1, wherein the method further comprises:

obtaining the slender convolution kernel neural network model.

4. The method according to claim 3, wherein the obtaining the slender convolution kernel neural network model comprises:

training a preset neural network model according to a preset visual perception image, feature information of a preset linear object image, and size information of the preset linear object image to generate the slender convolution kernel neural network model; wherein the preset visual perception image comprises the preset linear object image.

5. The method according to claim 4, wherein the training a preset neural network model according to a preset visual perception image, feature information of a preset linear object image, and size information of the preset linear object image to generate the slender convolution kernel neural network model comprises:

training the preset neural network model according to the preset visual perception image and the feature information of the preset linear image to generate an initial slender convolution kernel neural network model, wherein the initial slender convolution kernel neural network model has a mature underlying neural network layer; and training the initial slender convolution kernel neural network model according to the feature information of the preset linear object image and the size information of the preset linear object image to generate a final slender convolution kernel neural network model, wherein the final slender convolution kernel neural network model has a mature high-level neural network layer and the mature underlying neural network layer.

6. The method according to claim 1, wherein the obtaining a first visual perception image of an autonomous vehicle comprises:

obtaining the first visual perception image by an image acquisition apparatus in the autonomous vehicle.

7. The method according to claim 1, wherein the feature information of the target linear object image is stored in the form of a matrix or a list.

8. The method according to claim 1, wherein the size information of the target linear object image comprises at least one of head and tail positions and/or a width of the target linear object image.

9. An autonomous vehicle based position detection apparatus, comprising:

a memory, a processor, and a computer program stored on the memory and operable on the processor, wherein the processor, when running the computer program, is configured to:

obtain a first visual perception image of an autonomous vehicle; wherein the first visual perception image comprises a target linear object image;

identify the first visual perception image according to an underlying neural network layer in a slender convolution kernel neural network model to determine feature information of the target linear object image;

identify the feature information of the target linear object image by using a high-level neural network layer in the slender convolution kernel neural network model to determine size information of the target linear object image; and match the size information of the target linear object image with preset coordinate system map information to determine a position of the autonomous vehicle;

wherein the processor is further configured to:

divide the feature information of the target linear object image into equally spaced feature matrices along a form of the target linear object;

perform a weighted summation operation on each of the feature matrices and a slender convolution kernel in the slender convolution kernel neural network model respectively to obtain an operation result; and identify the operation result according to the high-level neural network layer in the slender convolution kernel neural network model to determine the size information of the target linear object image.

10. The apparatus according to claim 9, wherein the processor is further configured to:

project the preset coordinate system map information to the first visual perception image to obtain a projected coordinate system map information;

judge, in the projected coordinate system map information, whether there is a target object that matches the size information of the target linear object image; and determine the position of the autonomous vehicle according to a shooting angle of the first visual perception image and the projected coordinate system map information in a condition that it is determined that there is the target object.

11. The apparatus according to claim 9, wherein the processor is further configured to:

obtain the slender convolution kernel neural network model.

12. The apparatus according to claim 11, wherein the processor is configured to:

train a preset neural network model according to a preset visual perception image, feature information of a preset linear object image, and size information of the preset linear object image to generate the slender convolution kernel neural network model; wherein the preset visual perception image comprises the preset linear object image.

13. The apparatus according to claim 12, wherein the processor is configured to:

train the preset neural network model according to the preset visual perception image and the feature information of the preset linear image to generate an initial slender convolution kernel neural network model, wherein the initial slender convolution kernel neural network model has a mature underlying neural network layer.

14. The apparatus according to claim 13, wherein the processor is configured to:

train the initial slender convolution kernel neural network model according to the feature information of the preset linear object image and the size information of the preset linear object image to generate a final slender convolution kernel neural network model, wherein the final slender convolution kernel neural network model has a mature high-level neural network layer and the mature underlying neural network layer.

15. The apparatus according to claim 9, wherein the processor is configured to:

obtain the first visual perception image by an image acquisition apparatus in the autonomous vehicle.

16. The apparatus according to claim 9, wherein the feature information of the target linear object image is stored in the form of a matrix or a list.

17. The apparatus according to claim 9, wherein the size information of the target linear object image comprises at least one of head and tail positions and/or a width of the target linear object image.

18. A non-transitory readable storage medium, having computer instructions stored therein; wherein the computer instructions are configured to implement the autonomous vehicle based position detection method according to claim 1.

* * * * *